United States Patent
Perahia et al.

(10) Patent No.: US 6,320,850 B1
(45) Date of Patent: Nov. 20, 2001

(54) SATELLITE COMMUNICATION ADAPTIVE CONTROL CODING

(75) Inventors: Eldad Perahia, Hermosa Beach; Donald C. Wilcoxson, Redondo Beach; Chamroeun Kchao, San Jose, all of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/066,064

(22) Filed: Apr. 24, 1998

(51) Int. Cl.[7] .................................................. H04B 7/185
(52) U.S. Cl. .......................... 370/316; 370/248; 370/537; 714/713
(58) Field of Search ........................... 370/310, 314–317, 370/321–4, 326, 442, 477, 465, 532, 535–545; 375/240, 251, 240.01, 240.02, 240.24; 714/701, 704, 712, 713, 746, 786–7, 796

(56) References Cited

U.S. PATENT DOCUMENTS

| | | |
|---|---|---|
| 3,829,777 | 8/1974 | Muratani et al. . |
| 3,900,842 * | 8/1975 | Calabro et al. ................ 340/310.03 |
| 4,047,151 | 9/1977 | Rydbeck et al. . |
| 4,330,859 | 5/1982 | Takada . |
| 4,357,700 | 11/1982 | Alvarez, III et al. . |
| 4,495,619 | 1/1985 | Acampora . |
| 4,638,476 | 1/1987 | Acampora et al. . |
| 4,686,673 | 8/1987 | Hotta . |
| 4,763,322 | 8/1988 | Eizenhofer . |
| 4,800,570 | 1/1989 | Perrotta et al. . |
| 4,905,235 | 2/1990 | Saburi . |
| 4,941,199 * | 7/1990 | Saam ...................................... 455/10 |
| 5,122,875 * | 6/1992 | Raychaudhuri et al. ............ 348/390 |
| 5,327,576 | 7/1994 | Uddenfeldt et al. . |
| 5,473,601 | 12/1995 | Rosen et al. . |
| 5,485,464 | 1/1996 | Strodtbeck et al. . |
| 5,486,864 * | 1/1996 | Zdepski ................................ 348/423 |
| 5,511,079 | 4/1996 | Dillon . |
| 5,546,411 | 8/1996 | Leitch et al. . |
| 5,590,405 | 12/1996 | Daly et al. . |
| 5,657,358 | 8/1997 | Panech et al. . |
| 5,909,454 * | 6/1999 | Schmidt ............................... 371/43.2 |
| 6,005,897 * | 12/1999 | McCallister et al. ................ 375/340 |
| 6,016,568 * | 1/2000 | Wolf et al. ........................... 714/792 |
| 6,138,261 * | 10/2000 | Calabro et al. ...................... 340/310 |

OTHER PUBLICATIONS

Display exhibits at the Cincinnati Fire Show Mar. 23, 1994 showing On/Off switch, dimmer, battery and liquid crystal.

* cited by examiner

Primary Examiner—David R. Vincent

(57) ABSTRACT

A method for maximizing satellite downlink information rate is disclosed. A ground transmitter (102) applies an outer block code to a data channel, modulates it, and transmits an uplink data stream (104) to a satellite (106) which demodulates the uplink data stream to produce a demodulated uplink data stream consisting of 1 to N user channels (230). The method uses a first multiplexer (232) to produce 1 to M multiplexed data signals (234) which are fed into quality encoders (236). The quality encoders (236) encode the multiplexed data signals (234) according to a selected quality level to produce custom-coded data signals (238). The level of coding applied to the custom-coded data signals (238) may be controlled by information received by a channel measurement element (250). Next, the method passes the custom-coded data signals (238) into a second multiplexer (240) which produces one multiplexed data stream (242). The multiplexed data stream (242) is then fed into the satellite's modulator before transmission back to a ground receiver.

14 Claims, 4 Drawing Sheets

SATELLITE COMMUNICATION ADAPTIVE CONTROL CODING

BACKGROUND OF THE INVENTION

The present invention relates generally to satellite communication systems, and more particularly, to a method for maximizing the downlink information rate by applying adaptive error control coding on the satellite commensurate with the desired quality of the downlink channel.

Satellite-based systems have been employed for many years to provide real-time distribution of information on a global scale. Typically, multiple ground-based users transmit data channels multiplexed into one or more uplink signals to the satellite. A satellite may, for example, demodulate an uplink signal, extract and route the data channels to one of many downlink transmitters, and then remodulate the data channels for transmission on a downlink beam. As another example, a satellite may frequency translate the uplink signal, amplify it, and retransmit it to the ground without demodulation-remodulation.

In commercial applications where capacity generates revenue, one significant performance factor is the amount of information that is passed through the satellite (i.e., throughput). Generally, the higher the data throughput, the higher the revenue potential. However, a significant fraction of the total throughput may not be used for data because of the need to include error-correction coding to reduce the bit error rate ("BER") of the downlink beams. The BER is the ratio of incorrectly received bits to the total number of bits transmitted. Atmospheric gases, rain, clouds, fog, radio noise, depolarization, scintillation, and interference are examples of conditions that may increase the BER. Accordingly, protection is typically applied to the uplink and downlink beams to minimize the BER as seen by the user.

For example, if a user is located in an area of a region experiencing poor transmission or reception conditions (such as an area experiencing a rainstorm), the downlink beam in that region may need more protection because the downlink beam may be susceptible to signal fading (which leads to increased BER) as a result of the rain. In the past, even a small area experiencing increased BER in a larger region required that the downlink beam covering that entire region carry additional error protection.

One way to improve the BER of the downlink data stream is to increase the power level of the transmitted signal. However, this solution is generally undesirable because it is too expensive, power-consuming, and impractical to implement on a large-scale basis. An alternative to increasing the power level of the downlink beam is to channel code the entire data stream (a process known as "coding") before transmitting it to the satellite. Coding the data stream provides added protection to the data stream tantamount to an increase in power level. In particular, one frequently employed method of coding is referred to as "concatenated coding" and was first investigated by G. David Forney, Jr.

Concatenated codes typically employ two levels of coding: an inner and an outer coding. A concatenated code achieves a level of performance with less complexity than a single level of coding would generally require. The outer code typically employs some form of a block code: for example, a Reed-Solomon (RS) code. The block code essentially adds parity bits to each predetermined number of bits (a "block") of data. The inner code typically employs some form of a convolutional code, although block codes are also used.

One class of satellite systems, referred to as end-to-end coded systems, apply all error-control coding (e.g., both inner and outer codes in a concatenated coded scheme) at the uplink ground terminal. In these systems, all encoding and decoding is performed at the ground terminal. At the satellite, the data stream is demodulated, routed to the appropriate downlink transmitters, remodulated, and transmitted to a remote ground terminal. This type of satellite system is commonly referred to as a digital bit-pipe because it is "piping" the data from one ground terminal to another without applying any intermediate coding at the satellite.

Coding is commonly used in satellite systems to reduce transmitter power requirements and overall hardware costs. As disclosed in U.S. Pat. No. 4,800,570 to Perrotta et al., filed Apr. 30, 1987, entitled "Concatenated Code-Decode System for the Protection Against Interference of Digital Transmissions Through an Intermediate Regenerative Repeater," an inner code of a concatenated coding scheme may be applied at the satellite rather than on the ground. In digital telecommunications systems where generating the downlink beam is critical due to the limited transmitter power available on the satellite, applying the inner code of a concatenated coding scheme on the satellite improves the downlink BER without requiring large increases in transmitter power.

In the past, after the transmitted uplink data channels have been recovered to form a data stream on the satellite, the entire data stream is coded in the satellite to achieve a minimum BER for the ground terminal with the worst channel conditions. For example, if users A–Z are served by a given downlink beam and ground terminal A's channel conditions are poor, but ground terminal B–Z's channel conditions are excellent, the entire data stream comprising the downlink beam must nevertheless be coded to achieve a minimum BER for ground terminal A's channel condition. This is generally referred to as non-adaptive error-control coding. Thus, in the past, bandwidth has been wasted by providing ground terminals B–Z with channel coding beyond that actually required.

Applying non-adaptive error-control coding at the satellite is therefore undesirable because it needlessly assumes worst-case channel conditions for all downlink channels and thereby wastes the bandwidth of numerous downlink channels with superfluous error-control coding information. Loss of bandwidth translates into a loss of capacity which can translate into a loss of revenue. Non-adaptive error-control coding also has the further disadvantage of being inflexible. Because the same information rate is transmitted to all ground terminals simultaneously regardless of their channel conditions, users cannot be easily prioritized based on market criteria, such as the amount charged per service and the quality of service.

A need has long been present in the industry for an improved method for maximizing the downlink information rate which overcomes the disadvantages discussed above and previously experienced.

BRIEF SUMMARY OF THE INVENTION

It is an object of the present invention to provide a method for adaptive error-control coding at the satellite commensurate with the BER required for the channel conditions present at the ground terminals.

It is another object of the present invention to maximize the downlink information rate by applying adaptive error-control coding at the satellite.

It is another object of the present invention to increase the downlink bandwidth available for ground users by adapting an inner code based on desired individual user BER levels.

It is another object of the present invention to increase revenue in satellite communications systems by applying adaptive error control coding technique at the satellite.

It is another object of the present invention to improve the uplink and downlink signal-to-noise ratio characteristics for a given BER over satellite systems employing other coding schemes, for example end-to-end coding.

It is another object of the present invention to reduce the uplink and downlink $E_b/N_o$ pair required to achieve a given BER.

It is another object of the present invention to allow users to be prioritized based on any market-driven criteria, such as on the amount charged for service, quality of service, guaranteed minimum information rate, or minimum average information rate.

It is another object of the present invention to meet the needs of many different ground-based users demanding different data rates, BERs, and priorities without unnecessarily compromising downlink throughput at the expense of users in favorable channel conditions.

The method of the present invention allows different levels of error control coding to be applied on individual data channels commensurate with each of those users' particular requirements. Preliminarily, the data channels are first encoded, modulated, transmitted to the satellite in one or more uplink signals, and demodulated at the satellite to generate at least one demodulated uplink data stream. The method of the present invention first multiplexes the demodulated uplink data channels in the demodulated uplink data streams to produce a plurality of multiplexed data streams. Each data stream is formed from a sequence of demodulated uplink data channels and the number of multiplexed data streams may be less than or equal to the number of data channels.

Next, the method of the present invention encodes the multiplexed data streams according to a selected desired quality level to produce custom-coded data streams. This quality level may be dictated by a particular user's ground condition, a particular user's information rate requirements, or other suitable criteria. For example, multiplexed data stream 1 may be encoded according to a low quality level, but multiplexed data stream 2 may be encoded according to a relatively high quality level.

After encoding the multiplexed data streams, the method of the present invention multiplexes the custom-coded data streams to produce a multiplexed custom-coded data stream which is modulated and transmitted in a downlink beam to the ground-based users. Upon reception of the downlink beam, the ground-based user may demodulate the modulated downlink data stream, decode the inner code of the particular data channels corresponding to the user's assigned quality level, and then block decode the resulting encoded downlink data stream for manipulation, retransmission, or other use. The user only decodes that part of the entire downlink data stream encoded for that user's quality level. Therefore, individual users are not necessarily required to decode at the full coding rate used on other portions of the downlink beam. The data channel recovered by the ground-based user has thereby been custom coded in the satellite according to a selected quality level.

DETAILED DESCRIPTION OF THE INVENTION

Figure 1:
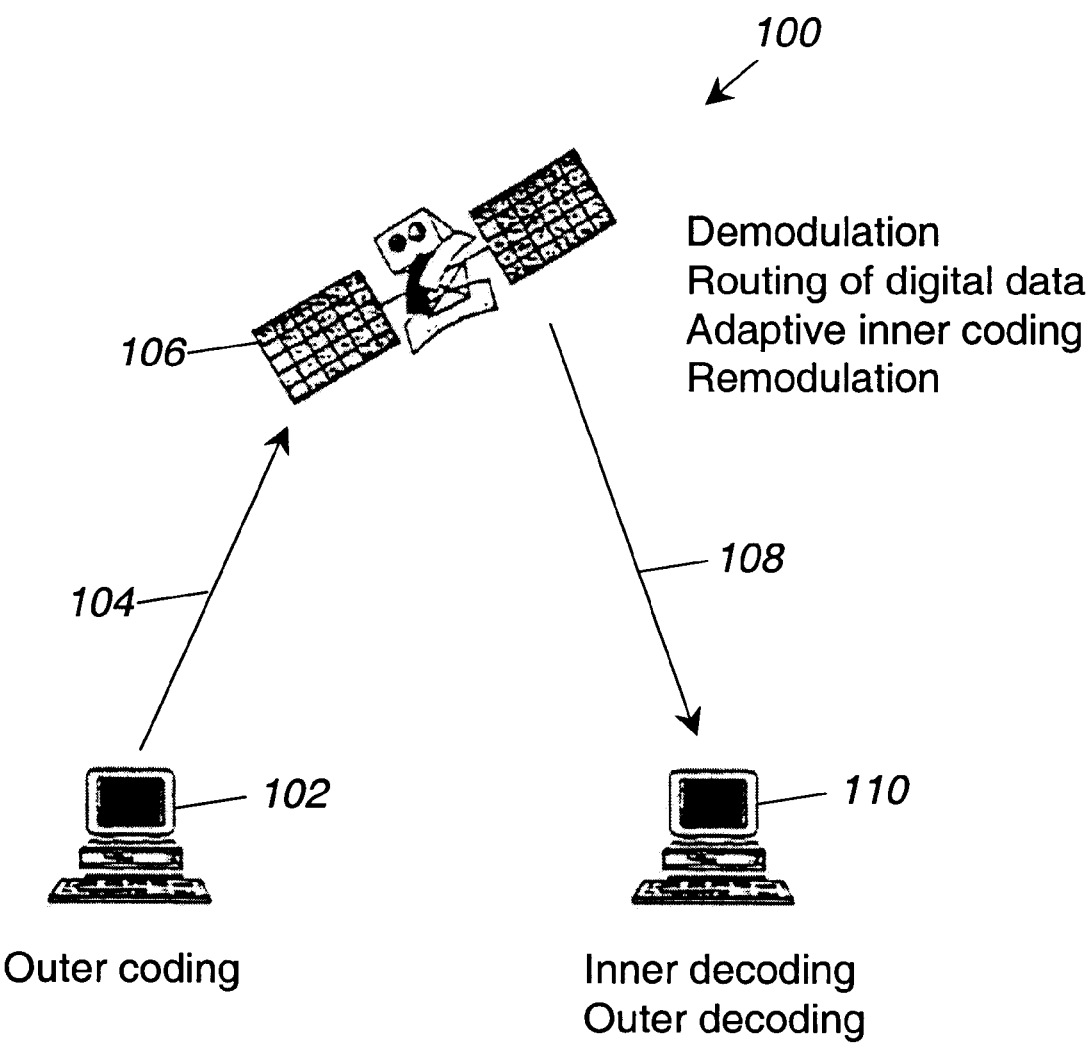
FIG. 1 shows a simplified block diagram of a communications network.

FIG. 1 shows a simplified block diagram of a communications network 100. The communications network 100 includes a ground transmitter 102, a ground receiver 110, and a satellite 106. The ground transmitter 102 transmits uplink data channels to the satellite 106. The satellite 106 transmits downlink data channels 108 to the ground receiver 110. The ground transmitter 102 and the ground receiver 110 may be included in, for example, satellite telephones, television stations, and the like.

Figure 2:
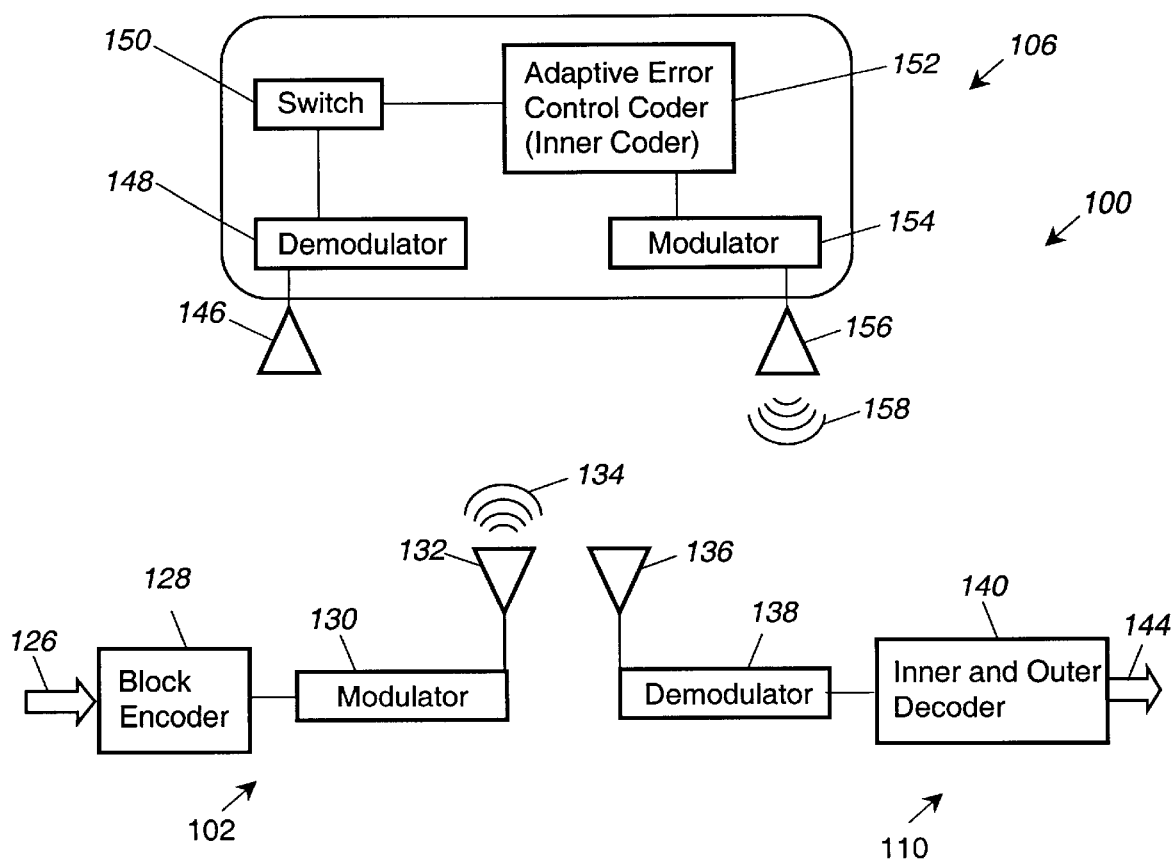
FIG. 2 shows a more detailed block diagram of a communications network.

FIG. 2 shows a more detailed block diagram of communications network 100 illustrating a ground transmitter 102, a ground receiver 110, and a satellite 106. The ground transmitter 102 includes a data input 126 which carries the data channels that will be transmitted through the satellite 106. A block encoder 128 is connected to the data input 126. The output of the block encoder is connected to a modulator 130. The modulator 130 drives the transmit antenna 132 to produce the uplink data stream 134.

The satellite 106 includes a satellite receive antenna 146 which is connected to a satellite demodulator 148. The output of the satellite demodulator 148 is connected to a switch 150 which, in turn, is connected to the adaptive error control coder 152. The adaptive error control coder 152 feeds a satellite modulator 154 which drives the satellite transmit antenna 156 to produce the downlink data stream 158.

The ground receiver 110 includes a receive antenna 136 connected to a demodulator 138. The output of the demodulator 138 is connected to a decoder 140 which includes both an inner code and outer code decoder. The data output 144 of the block decoder 140 carries decoded output data channels that are representative of the input data channels carried on data input 126.

In operation, the data input 126 of the ground transmitter 102 connects the input data channels to a block encoder 128. The input data channels may have been generated by virtually any source including, for example, a telephone network, television stations, and Internet networks.

The block encoder 128 generates an encoded internal data stream by coding the input data channels with a code chosen from a category of codes called block codes. Block codes essentially add parity bits to the data in the input data channels according to a predetermined mapping between input bits and associated parity sequences, but otherwise leave the data unchanged (such block codes are called "systematic"). For example, the block encoder 128 may use a Reed-Solomon code.

The encoded internal data stream is fed into the modulator 130. The modulator 130 generates a modulated data stream by applying an efficient transmission modulation to the encoded internal data stream 130. Among the many suitable modulation techniques that the modulator 130 may employ are Quadrature Phase Shift Keying (QPSK) and Binary Phase Shift Keying (BPSK). Subsequently, a power amplifier (not shown) typically applies the modulated data stream to the transmit antenna 132 to produce an uplink data stream 134. The uplink data stream 134 is an electromagnetic wave realization of the modulated uplink data stream that may be received by the satellite 106. Any number of data channels may be transmitted in the uplink data stream 134.

The satellite 106 processes the uplink data stream 134 received at the satellite receive antenna 146. A satellite demodulator 148 generates a demodulated internal data stream by removing the modulation from the uplink data stream 134. The output of the satellite demodulator 148 is connected to the switch 150. The switch 150 combines data channels (still block encoded) recovered by the satellite demodulator 148 into one or more internal data streams. By way of example, an internal data stream may consist of only data channels of a predetermined type, destination, or other characteristic.

Figure 3:
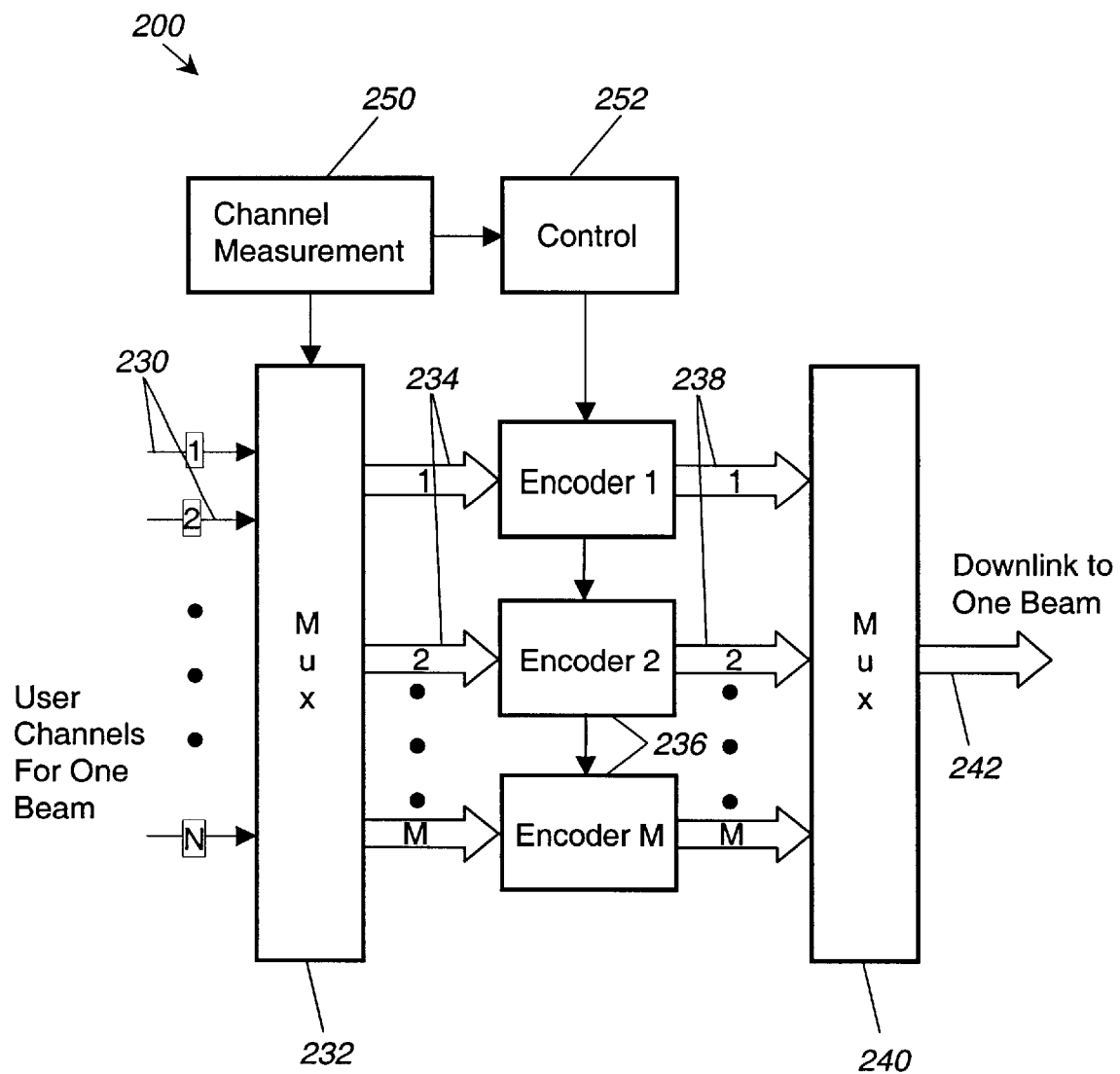
FIG. 3 shows a block diagram of the adaptive error control coding technique employed by the present invention.

Referring now to FIG. 3, data channels in an internal data stream are fed into the adaptive error control coder 200. The adaptive error control coder includes channel measurement hardware 250, control hardware 252, a first multiplexer 232, 1 to M quality encoders 236, and a second multiplexer 240. The channel measurement hardware 250 is connected to the first multiplexer 232 and the control hardware 252.

The internal data stream consists of 1 to N user channels 230. The 1 to N user channels 230 are connected to the first multiplexer 232 which groups the 1 to N user channels 230 according to the individual channel-coding requirements for the 1 to N user channels 230. The channel-coding requirements for each of the 1 to N user channels 230 may be determined by the channel measurement hardware 250, which may receive channel quality information, for example, from ground-based users. The channel measurement hardware 250, in turn, communicates the channel quality information to the first multiplexer 232 and the control hardware 252.

The first multiplexer 232 groups the 1 to N user channels 230 according to the information received from the channel measurement hardware 250. The resultant outputs of the multiplexer form the 1 to M multiplexed data stream 234. (Note that M may be greater than, less than or equal to N.) Multiplexed data stream 1, for example, may contain all user channels requiring additional coding due to increased BER because of rain storm effects, while multiplexed data channel 2, for example, may contain all user channels requiring no additional coding at all, and so on.

The 1 to M multiplexed data signals 234 are then fed into 1 to M quality encoders 236. The 1 to M encoders encode the resultant 1 to M multiplexed data streams according to a coding technique selected by the control hardware 252 to produce custom-coded data streams 238. The control hardware 252 receives information from the channel measurement hardware 250 on the coding required for the 1 to M quality encoders 236. It is contemplated that the 1 to M quality encoders may be implemented by individual hardware circuits, or by a microprocessor and encoding software, or by a combination of the two.

Thus, for example, quality encoder 1 may encode multiplexed data stream 1 according to a high level of coding providing the best BER, quality encoder 2 may encode multiplexed data stream 2 according to a lower level of coding, and so on. Therefore, the control hardware 252 determines which encoder is to apply which level of coding to the 1 to M multiplexed data streams. Finally, the custom-coded data streams 238 are fed into the second multiplexer 240 which multiplexes the custom-coded data streams 238 to produce a resultant multiplexed data stream used to generate the downlink beam 242.

Still referring to FIG. 3, in a preferred embodiment, the channel measurement hardware 250 may receive information representative of a measurement of the reception conditions (or channel environment) in which the ground receivers 110 are located. For example, the channel measurement hardware 250 may measure the signal-to-noise ratio of the user channels 230 to determine how much interference is present in the channel environment, or may interpret channel measurement reports sent by the ground-based users.

As an example, if user A is currently in a rain storm, but user B within the same region covered by a downlink beam for both A and B is not, the data channel for user A may require more coding than would user B. Thus, the channel measurement hardware 250 measures or receives measurements of the respective channel environments in which user A and B and other users are located. The present method recognizes that different users may require different levels of coding and applies coding as necessary for each particular user without reducing the throughput for data channels for all users.

In another embodiment, the channel measurement hardware 250 uses quality of service as a criteria for grouping users, instead of channel environment conditions. In this embodiment, the channel measurement hardware 250 prioritizes users according to any suitable market criteria. Examples of these criteria include quality of service, amount charged for service, minimum information rate, average minimum information rate, and the like.

For example, if user A has paid a premium for high priority service, then user A may, for example, be guaranteed a minimum BER in exchange for the premium paid. Thus, if user A enters a rain storm, user A may receive additional coding. Because user A has paid a premium for a high priority service, user A will receive that additional coding at the expense of lower priority users (which may be switched to less powerful coding (i.e., leading to worse BER performance) to provide the throughput required for the more powerful coding (better BER performance) for user A). Thus, the channel measurement hardware 250 can also function as a priority selector according to any suitable criteria.

The control hardware 252 can be located either on the satellite or at a network operations center (not shown) on the ground. The control hardware 252 determines, in response to information provided by the channel measurement hardware 250, which of the 1 to M multiplexed data signals 234 will receive which quality level of encoding. The control hardware 252 also determines which of the 1 to M multiplexed data signals 234 may be dropped, for example, because a particular user has not paid for a guaranteed minimum information rate and a higher priority user wants to pass information through the satellite. The control hardware 252, when located at the network operation center, when requested, may send information such as user priorities, throughput requirements, and the like to the satellite thereby eliminating the need for special control hardware on the satellite.

The 1 to M quality encoders 236 can be variances of the same encoder. In a preferred embodiment, the 1 to M quality encoders 236 are convolutional encoders, although other coding techniques may also be employed. The code rate of the 1 to M quality encoders 236 may start at a base rate of $\frac{1}{2}$, $\frac{1}{3}$, or $\frac{1}{4}$, for example. A base rate of $\frac{1}{2}$ indicates that for every one information bit, there is one additional coding bit added. Similarly, a base rate of $\frac{1}{4}$ indicates that for every one information bit, three additional coding bits are added. The code rate can be increased by a technique commonly known as puncturing. Puncturing involves the periodic deletion of code symbols from the sequence generated by a convolutional encoder for the purpose of obtaining a higher code rate. Thus, a half rate coder may be punctured to obtain a code rate of ⅔, ¾, ⅚, ⅞, and so on. Integrated circuits that perform the functions of the quality encoders 236 are commercially available.

Referring again to FIG. 2, the multiplexed downlink data stream 242 is subsequently fed into the satellite modulator 154. Like the modulator 130, the satellite modulator 154 may use any one of many modulation schemes, including M-PSK (for example QPSK or BPSK). The resultant modulated downlink data stream is applied to the satellite transmit antenna 156 which produces the downlink data stream 158.

At the ground receiver 110, the downlink data stream 158 is received on the receive antenna 136. The received signal is fed into a demodulator 138 which restores the downlink data stream 158 to its form before the satellite modulator 154 modified it for transmission. The output of the modulator 138 is therefore a reproduced multiplexed downlink data stream containing the individually coded (custom-coded) data streams.

Subsequently, the custom coded data streams present in the reproduced multiplexed downlink data stream are separated out and routed to an appropriate decoder, for example, decoder 140. The decoder 140 is designed to decode the custom inner code and outer code present on a particular custom coded data stream. The custom coded data streams may be separated out by demultiplexers or other control logic that responds, for example, to control information provided in a header in the downlink data stream 158. As another example, a network control center may transmit appropriate control information to the ground users. The decoder 140 may, for example, convolutionally decode a rate ¾ custom coded data stream. In many instances, the decoder 140 only decodes the portion of the custom coded data stream that contains the data channel for the particular ground receiver 110 in which the decoder 140 is located.

In FIG. 3, note that although only one adaptive error control coder 200 is shown for satellite 106, multiple adaptive error control coders can be present in a satellite, for example, one for each downlink beam that the satellite generates. Furthermore, a satellite may employ a combination of adaptive and non-adaptive error control coders. Note also that the ground transmitter 102 and the ground receiver 110 can be part of the same communications network; i.e., ground transmitter 102 and ground receiver 110 need not be geographically isolated.

Figure 4:
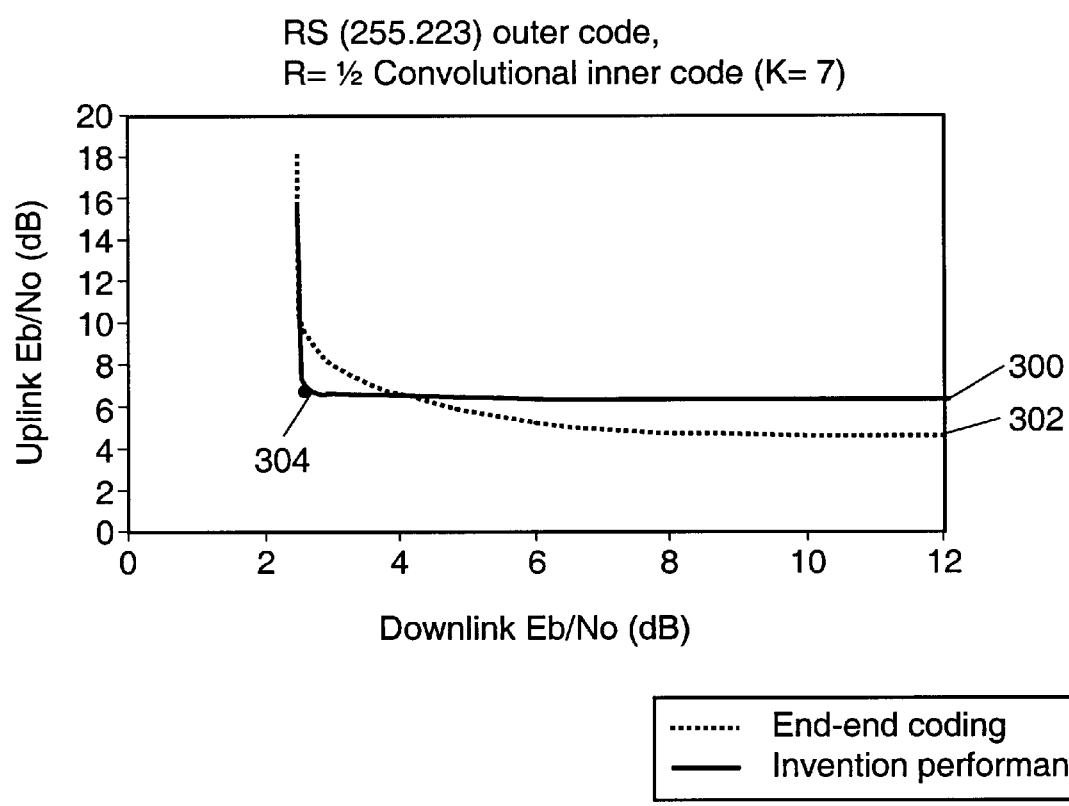
FIG. 4 shows exemplary curves, for a fixed BER, of calculated signal-to-noise ratios obtainable with the present invention compared with calculated signal-to-noise ratios obtainable with a system employing end-to-end coding.

Turning now to FIG. 4, that figure shows example curves for calculated signal-to-noise ratios obtainable with the present invention compared with calculated signal-to-noise ratios obtainable with a system employing end-to-end coding.

The curves contrast the performance of the present invention (curve 300) with the performance of a communications network employing end-to-end coding (curve 302) for a fixed BER. Similar increases in performance are obtainable using different combinations of inner and outer codes. For illustration, however, two curves are shown for an embodiment applying a Reed-Solomon code at the block encoder 128 of the ground transmitter 102 and applying a half-rate convolutional code at a quality encoder 236 of the adaptive error control coder 200 of the satellite 106. The Reed-Solomon code employed for curve 302 maps 223 source symbols to 255 code symbols to achieve a code rate of approximately ⅞ (223/255). The half-rate convolutional code employed for curve 300 has a constraint length K of 7.

FIG. 4 shows that for a fixed BER, for example $10^{-10}$, a user will achieve that BER when that user's operating point is anywhere on curves 300 or 302. If the user's operating point is above or to the right of the curve 300 or 302, that user's BER will be better (lower) than $10^{-10}$. Conversely, if that user's BER is below or to the left of the curve 300 or 302, that user's BER will be worse (higher) than $10^{-10}$. A user can obtain its required BER using a lower uplink and downlink $E_b/N_o$ pair than a user using end-to-end coding could obtain (illustrated, for example, by point 304 in FIG. 4). In other words, the present invention reduces the combination of uplink power and downlink power required for a given BER in comparison to an end-to-end system. Lower downlink power translates into savings in weight, cost, and complexity on the satellite. Additionally, since the inner code is not present on the uplink data stream, the bandwidth occupied by the uplink stream is less than in end-to-end coding, further increasing the available capacity in the satellite system.

While particular elements, embodiments and applications of the present invention have been shown and described, it will be understood, of course that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. In a satellite communication system comprising a satellite, a method for adaptive control coding comprising:
    (a) determining channel-coding requirements for data in a plurality of user channels communicating with the satellite;
    (b) grouping the data into a plurality of data groups according to the channel coding requirements;
    (c) error-control encoding said data groups according to the channel coding requirements to generate encoded data; and
    (d) transmitting said encoded data to a receiver.

2. The method of claim 1, further comprising the steps of:
    (a) block encoding input data in the user channels to produce an encoded uplink data stream;
    (b) modulating said encoded uplink data stream to produce a modulated uplink data stream;
    (c) transmitting said modulated uplink data stream to the satellite; and
    (d) demodulating said modulated uplink data stream in said satellite to produce an uplink data stream.

3. The method of claim 1, further comprising the step of modulating said encoded data by employing M-PSK modulation to produce a modulated downlink data stream.

4. The method of claim 2, wherein said step of modulating said encoded uplink data stream employs an M-PSK modulation.

5. The method of claim 1, wherein said error-control encoding step applies a convolutional code.

6. The method of claim 5, wherein said error-control encoding step punctures said convolutional code.

7. The method of claim 6, wherein said error-control encoding step punctures said convolutional code to produce code rates between ½ and ⅞ inclusive.

8. The method of claim 1, wherein said error-control encoding step applies a family of block codes of various rates.

9. The method of claim 1, wherein said error-control encoding step comprises producing a custom-coded data stream.

10. The method of claim 9, wherein said error-control encoding step implements error-control codes in software.

11. In a satellite communication system comprising a satellite, an adaptive control coding apparatus comprising;
   a channel measurer arranged to determine channel-coding requirements for data in a plurality of user channels communicating with the satellite;
   a multiplexer arranged to group the data into a plurality of data groups according to the channel-coding requirements;
   a plurality of encoders arranged to encode the data groups according to the channel coding requirements to generate custom-coded data; and
   a transmitter arranged to transmit the custom-coded data.

12. The apparatus of claim 11 wherein the channel coding requirements are determined at least in part by criteria comprising one or more of desired quality of service, propagation conditions, amount charged for service and minimum information rate.

13. The apparatus of claim 11 further comprising a controller connected to said plurality of encoders for selecting a level of coding for said encoders to apply.

14. The method of claim 1 wherein the step of determining channel-coding requirements comprises determining the channel-coding requirements at least in part by criteria comprising one or more of desired quality of service, propagation conditions, amount charged for service and minimum information rate.

* * * * *